US008257857B2

(12) United States Patent
Lee et al.

(10) Patent No.: US 8,257,857 B2
(45) Date of Patent: Sep. 4, 2012

(54) METHOD FOR MANUFACTURING SEPARATORS, SEPARATORS MANUFACTURED BY THE METHOD AND ELECTROCHEMICAL DEVICES INCLUDING THE SEPARATORS

(75) Inventors: Joo-Sung Lee, Daejeon (KR); Jong-Hun Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 13/088,548

(22) Filed: Apr. 18, 2011

(65) Prior Publication Data

US 2011/0195294 A1 Aug. 11, 2011

Related U.S. Application Data (63) Continuation of application No. PCT/KR2010/008402, filed on Nov. 25, 2010.

(30) Foreign Application Priority Data

Nov. 27, 2009 (KR) .................. 10-2009-0115568
Nov. 25, 2010 (KR) .................. 10-2010-0117922

(51) Int. Cl.
*H01M 2/16* (2006.01)
*B32B 37/00* (2006.01)
(52) U.S. Cl. ............. 429/144; 429/251; 156/272.6
(58) Field of Classification Search .......... 429/144, 429/251; 125/272.6; 156/272.6
See application file for complete search history.

(56) References Cited

U.S. PATENT DOCUMENTS

2006/0008700 A1* 1/2006 Yong et al. ............. 429/144
2009/0291348 A1* 11/2009 Hirashige et al. ........ 429/33

FOREIGN PATENT DOCUMENTS

| JP | 61-114467 A | 6/1986 |
| JP | 62-082653 A | 4/1987 |
| JP | 2003-151538 A | 5/2003 |
| KR | 2008-0101043 A | 11/2008 |

OTHER PUBLICATIONS

International Search Report, PCT/KR2010/008402, dated Jul. 6, 2011.

* cited by examiner

*Primary Examiner* — Stephen J. Kalafut
(74) *Attorney, Agent, or Firm* — Lerner, David, Littenberg, Krumholz & Mentlik, LLP

(57) ABSTRACT

A method for manufacturing separators includes (S1) treating at least one of the laminating surfaces of two porous substrates by corona discharge and laminating the porous substrates, (S2) preparing a slurry containing inorganic particles dispersed therein and a solution of a binder polymer in a solvent, and coating the slurry on both surfaces of the laminate of the porous substrates, and (S3) delaminating the coated laminate of the porous substrates. According to the method, two separators can be simultaneously manufactured with enhanced productivity. In addition, corona discharge can reduce damage to the surfaces of the porous substrates during lamination while maintaining the porosities of the porous substrates. Therefore, excellent performance of electrochemical devices using the separators can be ensured.

14 Claims, 3 Drawing Sheets

METHOD FOR MANUFACTURING SEPARATORS, SEPARATORS MANUFACTURED BY THE METHOD AND ELECTROCHEMICAL DEVICES INCLUDING THE SEPARATORS

CROSS-REFERENCE TO RELATED APPLICATION

This application is a continuation of International Application No. PCT/KR2010/008402 filed on Nov. 25, 2010, which claims priority to Korean Patent Application No. 10-2009-0115568 filed in the Republic of Korea on Nov. 27, 2009, and Korean Patent Application No. 10-2010-0117922 filed in the Republic of Korea on Nov. 25, 2010, the entire contents of which are incorporated herein by reference.

FIELD OF THE INVENTION

The present invention relates to a method for manufacturing separators for electrochemical devices such as lithium secondary batteries, separators manufactured by the method, and electrochemical devices including the separators.

BACKGROUND OF THE INVENTION

Recently, there has been increasing interest in energy storage technologies. As the application fields of energy storage technologies have been extended to mobile phones, camcorders, notebook computers and even electric cars, efforts have increasingly been made towards the research and development of electrochemical devices. Under these circumstances, rechargeable secondary batteries in particular have attracted considerable attention as the most promising electrochemical devices. In recent years, extensive research and development has been conducted to design new electrodes and batteries for the purpose of improving capacity density and specific energy of the batteries.

Many secondary batteries are currently available. Lithium secondary batteries developed in the early 1990's have drawn particular attention due to their advantages of higher operating voltages and much higher energy densities than conventional aqueous electrolyte-based batteries such as Ni-MH batteries, Ni—Cd batteries, and $H_2SO_4$—Pb batteries. However, such lithium ion batteries suffer from safety problems, such as fire or explosion, encountered with the use of organic electrolytes and are disadvantageously complicated to fabricate. In attempts to overcome the disadvantages of lithium ion batteries, lithium ion polymer batteries have been developed as next-generation batteries. More research is still urgently needed to improve the relatively low capacities and insufficient discharge capacities at low temperature of lithium ion polymer batteries in comparison with lithium ion batteries.

Many companies have produced a variety of electrochemical devices with different safety characteristics. It is very important to evaluate and ensure the safety of such electrochemical devices. The most important consideration is that operational failure or malfunction of electrochemical devices should not cause injury to users. For this purpose, regulatory guidelines strictly restrict potential dangers, such as fire and smoke emission, of electrochemical devices. Overheating of an electrochemical device may cause thermal runaway or puncture of a separator may pose an increased risk of explosion. In particular, porous polyolefin substrates commonly used as separators for electrochemical devices undergo severe thermal shrinkage at a temperature of 100° C. or higher on account of their material properties and in view of manufacturing processing including elongation. This thermal shrinkage behavior may cause short-circuiting between a cathode and an anode.

In order to solve the above safety problems of electrochemical devices, a separator has been suggested in which a mixture of excessive inorganic particles and a binder polymer is coated on at least one of the surfaces of a highly porous substrate to form an organic-inorganic porous coating layer. The inorganic particles present in the organic-inorganic porous coating layer are heat resistant enough to prevent short-circuiting between a cathode and an anode of an electrochemical device when the electrochemical device is overheated.

In the manufacture of such a separator, it is common practice to form organic-inorganic coating layers on a porous substrate by dip coating. According to this manufacturing method, the organic-inorganic coating layers are simultaneously formed on both surface of the porous substrate by dip coating. However, coating of both surfaces of the porous substrate is not necessarily needed to solve the safety problems of an electrochemical device. The formation of the two coating layers on the single substrate by dip coating is economically undesirable.

Thus, there is a need to develop a method for simultaneously manufacturing two or more separators in a stable and economical manner.

SUMMARY OF THE INVENTION

An aspect of the present invention is to provide a method for manufacturing separators in which a porous substrate is coated with an organic-inorganic binder slurry to form an organic-inorganic composite coating layer, resulting in enhanced productivity.

The present invention provides a method for manufacturing separators, the method including (S1) treating at least one of the laminating surfaces of two porous substrates by corona discharge and laminating the porous substrates, (S2) preparing a slurry containing inorganic particles dispersed therein and a solution of a binder polymer in a solvent, and coating the slurry on both surfaces of the laminate of the porous substrates, and (S3) delaminating the coated laminate of the porous substrates.

Preferably, each of the porous substrates is made of a polyolefin.

The polyolefin may be selected from the group consisting of polyethylene, polypropylene, polybutylene and polypentene.

Preferably, each of the porous substrates has a thickness of 5 to 50 μm, a pore size of 0.01 to 50 μm and a porosity of 10 to 95%.

Preferably, the slurry is coated on the porous substrates by dip coating.

Preferably, the inorganic particles have an average particle diameter of 0.001 to 10 μm, and are selected from the group consisting of inorganic particles having a dielectric constant of 5 or above, inorganic particles having the ability to transport lithium ions and mixtures thereof.

The inorganic particles having a dielectric constant of 5 or above may be selected from the group consisting of $BaTiO_3$, $Pb(Zr_x,Ti_{1-x})O_3$ (PZT, $0<x<1$), $Pb_{1-x}La_xZr_{1-y}Ti_yO_3$ (PLZT, $0<x<1, 0<y<1$), $(1-x)Pb(Mg_{1/3}Nb_{2/3})O_3$-$xPbTiO_3$ (PMN-PT, $0<x<1$), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, $TiO_2$ particles, and mixtures thereof.

The inorganic particles having the ability to transport lithium ions may be selected from the group consisting of lithium phosphate (Li$_3$PO$_4$), lithium titanium phosphate (Li$_x$Ti$_y$(PO$_4$)$_3$, 0<x<2, 0<y<3), lithium aluminum titanium phosphate (Li$_x$Al$_y$Ti$_z$(PO$_4$)$_3$, 0<x<2, 0<y<1, 0<z<3), (LiAlTiP)$_x$O$_y$ type glass (0<x<4, 0<y<13), lithium lanthanum titanate (Li$_x$La$_y$TiO$_3$, 0<x<2, 0<y<3), lithium germanium thiophosphate (Li$_x$Ge$_y$P$_z$S$_w$, 0<x<4, 0<y<1, 0<z<1, 0<w<5), lithium nitride (Li$_x$N$_y$, 0<x<4, 0<y<2), SiS$_2$ type glass (Li$_x$Si$_y$S$_z$, 0<x<3, 0<y<2, 0<z<4), P$_2$S$_5$ type glass (Li$_x$P$_y$S$_z$, 0<x<3, 0<y<3, 0<z<7) particles, and mixtures thereof.

Preferably, the inorganic particles and the binder polymer are used in a weight ratio of 50:50 to 99:1.

The binder polymer may be selected from the group consisting of polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose, and mixtures thereof.

The present invention also provides a separator including a porous substrate wherein the porous substrate has an uncoated first surface and a second surface covered with an organic/inorganic composite layer containing inorganic particles and a binder polymer, and the areas of characteristic peaks of the binder polymer and the porous substrate at the first and second surfaces, as measured using an attenuated total reflection Fourier transform infrared (ATR-FTIR) spectrometer, satisfy the following mathematical FIG. 1.

Mathematical Figure 1

$$0 \leq \frac{\dfrac{\text{Area of characteristic peaks of the binder polymer at the first surface}}{\text{Area of characteristic peaks of the porous substrate at the first surface}}}{\dfrac{\text{Area of characteristic peaks of the binder polymer at the second surface}}{\text{Area of characteristic peaks of the porous substrate at the second surface}}} < 0.5$$

Each of the separators of the present invention can be interposed between a cathode and an anode and laminated to the electrodes to fabricate an electrochemical device such as a lithium secondary battery or a supercapacitor device.

According to the method of the present invention, two separators can be simultaneously manufactured with enhanced productivity. In addition, corona discharge can reduce damage to the surfaces of the porous substrates during lamination while maintaining the porosities of the porous substrates, thus ensuring excellent performance of electrochemical devices using the separators.

BRIEF DESCRIPTION OF THE DRAWINGS

The accompanying drawings illustrate preferred embodiments of the invention and, together with the foregoing disclosure, serve to provide further understanding of the technical spirit of the invention. However, the present invention is not to be construed as being limited to the drawings.

DETAILED DESCRIPTION OF THE INVENTION

The present invention will now be described in detail. It should be understood that terms and words used in the specification and the appended claims are not be construed as having common and dictionary meanings, but should be interpreted as having meanings and concepts corresponding to technical ideas of the present invention in view of the principle that the inventor can properly define the concepts of the terms and words in order to describe his/her own invention with the best method.

Figure 1:
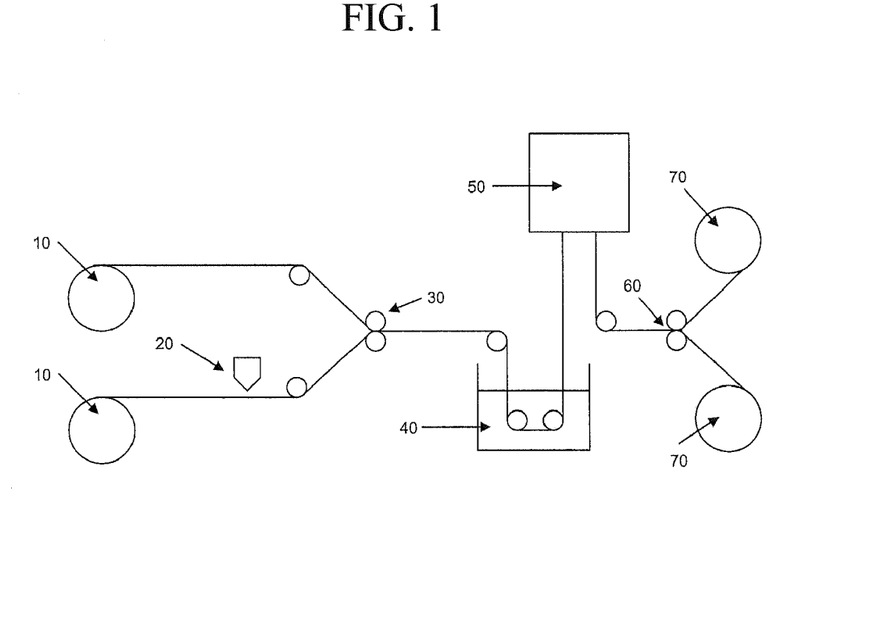
FIG. 1 is a process flow diagram schematically illustrating a method for manufacturing separators according to an embodiment of the present invention.

A method for manufacturing separators according to an embodiment of the present invention is schematically illustrated in FIG. 1. Embodiments described herein are provided for illustrative purposes only and are not intended to limit the technical scope of the invention. As such, it should be understood that other equivalents and modifications could be made thereto at the time of filing the present application.

The present invention provides a method for manufacturing separators. An explanation will be given of the method according to the present invention.

First, at least one of the laminating surfaces of two porous substrates is treated by corona discharge and the porous substrates are laminated (Step S1).

As illustrated in FIG. 1, one or two laminating surfaces of porous substrates 10 are treated by corona discharge 20 and the porous substrates are laminated 30.

Corona discharge is a phenomenon in which when a conductor as an electrode and a metal plate as a counter electrode are used to increase direct current power, the electrode is colored purple and an electric current flows. Corona discharge modifies the surface of the porous substrate 10 to make the surface hydrophilic and increase the adhesive strength of the surface, thus facilitating lamination of the porous substrates. Particularly, the lamination is a temporary step that facilitates the subsequent steps and does not require strong adhesion between the porous substrates. The lamination is performed using rollers under mild operational conditions in terms of pressure and temperature, which can protect the surfaces of the porous substrates from damage (e.g., scratches) while maintaining the porosities of the porous substrates. Further, the porous substrate treated by corona discharge is easy to separate, which can minimize damage to the surfaces of the porous substrates during subsequent delamination.

Meanwhile, in the case where the porous substrate is not subjected to corona discharge, the porous substrates are laminated by heating at a predetermined temperature or by the use of pressurization rolls applying a high pressure to impart an adhesive strength to the pressurized surfaces. However, heating or pressurization causes the occurrence of scratches on the surfaces of the porous substrates and decreases the porosities of the porous substrates. The characteristics of separators, each including an organic-inorganic composite coating layer, manufactured by the method of the present invention are particularly sensitive to the porosities of the porous substrates, thus giving a great influence on the performance of electrochemical devices. The strong pressurization or heating may increase the risk of damage to the surfaces of the porous substrates during subsequent delamination.

The porous substrates may be porous planar substrates commonly used in electrochemical devices. Examples of such porous planar substrates include various porous polymer membranes and non-woven fabrics. As the porous polymer membranes, there can be used, for example, porous polyolefin membranes used in separators for electrochemical devices, in particular, lithium secondary batteries. The non-woven fabrics may be, for example, those composed of polyethylene phthalate fibers. The material or shape of the porous substrates may vary according to intended purposes. Examples of suitable materials for the porous polyolefin membranes include polyethylene polymers, such as high density polyethylene, linear low density polyethylene, low density polyethylene and ultrahigh molecular weight polyethylene, polypropylene, polybutylene and polypentene. These polyolefins may be used alone or as a mixture thereof. Examples of suitable materials for the non-woven fabrics include polyolefins and polymers having higher heat resistance than polyolefins. The thickness of the porous substrates is preferably from 1 to 100 µm, more preferably from 5 to 50 µm, but is not particularly limited to this range. The pore size and porosity of the porous substrates are preferably from 0.01 to 50 µm and 10 to 95%, respectively, but are particularly limited to these ranges.

Subsequently, a slurry containing inorganic particles dispersed therein and a solution of a binder polymer in a solvent is prepared, and the slurry is coated on both surfaces of the laminate of the porous substrates (Step S2).

There is no particular restriction as to the coating method. The slurry is preferably coated by dip coating 40. The dip coating is carried out by dipping the laminate of the substrates in a tank containing the slurry as a coating solution to coat both surfaces of the laminate. The thickness of coating layers formed on the laminate can be controlled depending on the concentration of the coating solution and the withdrawal speed of the laminate from the coating solution tank. Thereafter, the coated laminate is dried in an oven 50 to form coating layers on both surfaces of the laminate.

The inorganic particles contained in the slurry are not specifically limited so long as they are electrochemically stable. In other words, the inorganic particles can be used without particular limitation in the present invention if they do not undergo oxidation and/or reduction reactions within an operating voltage range applied to an electrochemical device (for example, 0-5 V for Li/Li$^+$). In particular, a high dielectric constant of the inorganic particles can contribute to an increase in the degree of dissociation of salts (e.g., lithium salts) in a liquid electrolyte to improve the ionic conductivity of the electrolyte.

For these reasons, the inorganic particles are preferably those having a dielectric constant of 5 or above, preferably 10 or above. Non-limiting examples of inorganic particles having a dielectric constant of 5 or above include $BaTiO_3$, $Pb(Zr_x, Ti_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3-xPbTiO_3$ (PMN-PT, $0<x<1$), hafnia ($HfO_2$), $SrTiO_3$, $SnO_2$, $MgO$, $NiO$, $CaO$, $ZnO_2$, $ZrO_2$, $Y_2O_3$, $Al_2O_3$, $TiO_2$ and SiC particles. These organic inparticles may be used alone or as a mixture of two or more kinds thereof.

The inorganic particles may be those having the ability to transport lithium ions, that is, inorganic particles containing lithium atoms and having the ability to transfer lithium ions without storing the lithium. Non-limiting examples of inorganic particles having the ability to transport lithium ions include lithium phosphate ($Li_3PO_4$) particles, lithium titanium phosphate ($Li_xTi_y(PO_4)_3$, $0<x<2$, $<y<3$) particles, lithium aluminum titanium phosphate ($Li_xAl_yTi_z(PO_4)_3$, $0<x<2$, $0<y<1$, $0<z<3$) particles, $(LiAlTiP)_xO_y$ type glass ($0<x<4$, $0<y<13$) particles such as $14Li_2O-9Al_2O_3-38TiO_2-39P_2O_5$ particles, lithium lanthanum titanate ($Li_xLa_yTiO_3$, $0<x<2$, $0<y<3$) particles, lithium germanium thiophosphate ($Li_xGe_yP_zS_w$, $0<x<4$, $0<y<1$, $0<z<1$, $0<w<5$) particles such as $Li_{3.25}Ge_{0.25}P_{0.75}S_4$ particles, lithium nitride ($Li_xN_y$, $0<x<4$, $0<y<2$) particles such as $Li_3N$ particles, $SiS_2$ type glass ($Li_xSi_yS_z$, $0<x<3$, $0<y<2$, $0<z<4$) particles such as $Li_3PO_4-Li_2S-SiS_2$ particles, and $P_2S_5$ type glass ($Li_xP_yS_z$, $0<x<3$, $0<y<3$, $0<z<7$) particles such as $LiI-Li_2S-P_2S_5$ particles. These inorganic particles may be used alone or as a mixture of two or more kinds thereof.

There is no particular restriction as to the average particle diameter of the inorganic particles. The average particle diameter of the inorganic particles is preferably limited to the range of 0.001 to 10 µm. This range enables each of the coating layers to have a uniform thickness and an optimal porosity. An average particle diameter less than 0.001 µm may lead to deterioration in dispersibility. Meanwhile, an average particle diameter exceeding 10 µm may lead to an increase in the thickness of the coating layers.

The binder polymer preferably has a glass transition temperature ($T_g$) between −200° C. and 200° C. Within this range, the mechanical properties (e.g., flexibility and elasticity) of the coating layers can be improved.

The binder polymer does not necessarily need to exhibit ionic conductivity. However, since the ionic conductivity of the binder polymer can further improve the performance of an electrochemical device, it is preferred that the binder polymer has a dielectric constant as high as possible. In practice, the degree of dissociation of salts in an electrolyte is dependent on the dielectric constant of a solvent used in the electrolyte. Therefore, a higher dielectric constant of the binder polymer can lead to a higher degree of dissociation of salts in an electrolyte. The dielectric constant of the binder polymer is in the range between 1.0 and 100 (as measured at a frequency of 1 kHz), particularly preferably 10 or above.

Further, impregnation of the binder polymer with a liquid electrolyte allows the binder polymer to be gelled, resulting in a high degree of swelling of the binder polymer. For a high degree of swelling, the binder polymer preferably has a solubility parameter between 15 and 45 Mpa$^{1/2}$, more preferably between 15 and 25 Mpa$^{1/2}$ and between 30 and 45 Mpa$^{1/2}$. Accordingly, a hydrophilic polymer having many polar groups is preferred as the binder polymer over a hydrophobic polymer such as a polyolefin. A solubility parameter less than 15 Mpa$^{1/2}$ or exceeding 45 Mpa$^{1/2}$ makes it difficult to swell the binder polymer in a typical liquid electrolyte for a battery.

Non-limiting examples of such binder polymers include polyvinylidene fluoride-co-hexafluoropropylene, polyvinylidene fluoride-co-trichloroethylene, polymethyl methacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, and carboxymethyl cellulose.

The weight ratio of the inorganic particles to the binder polymer is preferably from 50:50 to 99:1, more preferably from 70:30 to 95:5. The use of the inorganic particles in an amount of less than 50% by weight (i.e. in an amount less than that of the binder polymer) may reduce the pore size and porosity of the coating layers. Meanwhile, the use of the inorganic particles in an amount exceeding 99% by weight may deteriorate the peeling resistance of the coating layers.

The solvent used to dissolve the binder polymer preferably has a solubility parameter similar to that of the binder polymer and a low boiling point, which are advantageous for uniform mixing and ease of solvent removal. Non-limiting examples of solvents usable to dissolve the binder polymer include acetone, tetrahydrofuran, methylene chloride, chloroform, dimethylformamide, N-methyl-2-pyrrolidone (NMP), cyclohexane and water. These solvents may be used alone or as a mixture thereof.

The slurry can be prepared by dissolving the binder polymer in the solvent, adding the inorganic particles to the solution, and dispersing the inorganic particles in the solution. The inorganic particles may be crushed to a proper size before addition to the solution of the binder polymer. Preferably, the inorganic particles are added to the solution of the binder polymer and are then dispersed in the solution while being crushed by a suitable technique such as ball milling.

Then, the coated laminate of the porous substrates is delaminated (Step S3).

The delamination 60 of the coated laminate gives two separators 70. For delamination, two winders can be used to physically separate the two porous substrates. According to the method of the present invention, two separators can be manufactured simultaneously, resulting in improved productivity. In addition, corona discharge can reduce damage to the surfaces of the porous substrates during lamination.

In each of the organic-inorganic composite coating layers formed by the method of the present invention, the inorganic particles are fixedly connected to each other by the binder polymer and interstitial volumes created between the inorganic particles form pores. That is, the binder polymer attaches (that is, fixedly connects) the inorganic particles to each other so as to maintain a state in which the inorganic particles are bound to each other. Another function of the binder polymer is to maintain a state in which the organic-inorganic composite coating layers are bound to the porous substrates. In each of the organic-inorganic composite coating layers, the inorganic particles are in substantial contact with each other and have a closest packed structure. Interstitial volumes created between the inorganic particles in contact with each other become pores of the organic-inorganic composite coating layers.

Figure 4:
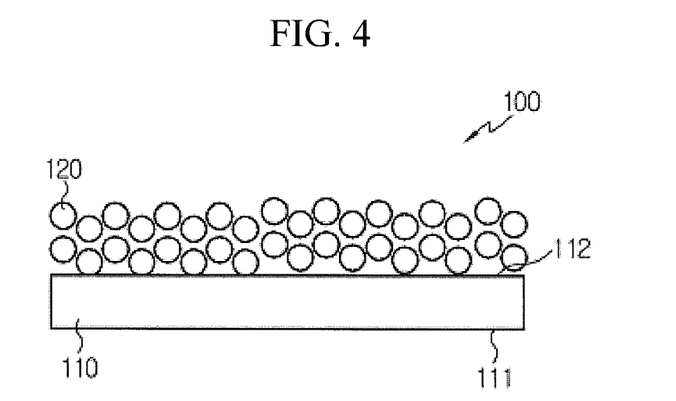
FIG. 4 is a view illustrating regions of a separator according to an embodiment of the present invention for ATR-FTIR measurement.

FIG. 4 illustrates a cross-sectional view of a separator 100 according to an embodiment of the present invention. Referring to FIG. 4, the porous substrate of the separator 100 has an uncoated first surface 111 and a second surface 112 covered with the organic/inorganic composite layer 120 containing the inorganic particles and the binder polymer. The areas of characteristic peaks of the binder polymer and the porous substrate 110 at the first surface 111 and the second surface 112, as measured using an ATR-FTIR spectrometer, satisfy the following mathematical FIG. 1.

Mathematical Figure 1

$$0 \leq \frac{\dfrac{\text{Area of characteristic peaks of the binder polymer at the first surface}}{\text{Area of characteristic peaks of the porous substrate at the first surface}}}{\dfrac{\text{Area of characteristic peaks of the binder polymer at the second surface}}{\text{Area of characteristic peaks of the porous substrate at the second surface}}} < 0.5$$

The first surface 111 of the porous substrate 110 is uncoated and the second surface 112 is covered with the organic/inorganic composite layer 120 containing the inorganic particles and the binder polymer. The binder polymer contained in the organic/inorganic composite layer 120 formed on the porous substrate 110 permeates pores of the porous substrate. As a result, the binder polymer is present at the surface and inside the porous substrate 110. The concentration of the binder polymer in the porous substrate 110 can be measured by ATR-FTIR spectroscopy. From the ratio of the area of characteristic peaks inherent to the binder polymer to that of the characteristic peaks inherent to the porous substrate, the concentration of the binder polymer in the porous substrate 110 can be quantitatively analyzed.

Generally, in the case where a separator includes an organic/inorganic composite layer containing inorganic particles and a binder polymer coated on one surface of a porous substrate, the binder polymer is also detected at the surface of the porous substrate uncovered with the organic/inorganic composite layer. In contrast, in the separator 100 manufactured by the method of the present invention, none or a very small amount of the binder polymer is detected at the surface of the porous substrate uncovered with the organic/inorganic composite layer.

Based on ATR-FTIR quantitative analysis, this can be expressed by the following mathematical FIG. 1.

Mathematical Figure 1

$$0 \leq \frac{\dfrac{\text{Area of characteristic peaks of the binder polymer at the first surface}}{\text{Area of characteristic peaks of the porous substrate at the first surface}}}{\dfrac{\text{Area of characteristic peaks of the binder polymer at the second surface}}{\text{Area of characteristic peaks of the porous substrate at the second surface}}} < 0.5$$

As used in the mathematical FIG. 1, the term "characteristic peaks" represents IR peaks inherent to the respective compounds. The characteristic peaks are measured by ATR-FTIR spectroscopy. The characteristic peaks of the binder polymer at the first surface 111 are identical to those of the binder polymer at the second surface 112, and the characteristic peaks of the porous substrate at the first surface 111 are identical to those of the porous substrate at the second surface 112. Therefore, the distributions of the binder polymer can be confirmed from the mathematical FIG. 1 representing the ratio of the areas of the same characteristic peaks.

In each of the separators manufactured by the method of the present invention, none or a very small amount of the binder polymer is observed at the surface of the porous substrate uncovered with the organic/inorganic composite layer. Therefore, the value obtained from the mathematical FIG. 1 may be equal to or greater than 0 and less than 0.5.

The present invention also provides an electrochemical device including each of the separators manufactured by the method. The electrochemical device of the present invention can be fabricated by interposing the separator between a cathode and an anode, followed by lamination. The electrochemical device of the present invention may be any device in which electrochemical reactions occur. Specific examples of such electrochemical devices include all kinds of primary batteries, secondary batteries, fuel cells, solar cells, and capacitors such as supercapacitor devices. Particularly preferred are lithium secondary batteries, including lithium metal secondary batteries, lithium ion secondary batteries, lithium polymer secondary batteries and lithium ion polymer secondary batteries.

The electrochemical device of the present invention includes a cathode and an anode, together with the separator. There is no particular restriction on the type of the electrodes. Each of the electrodes can be produced by binding an electrode active material to an electrode current collector by suitable methods known in the art. The cathode active material may be any of those commonly used in cathodes of conventional electrochemical devices. Non-limiting examples of preferred cathode active materials include lithium manganese oxides, lithium cobalt oxides, lithium nickel oxides, lithium iron oxides and lithium composite oxides thereof. The anode active material may be any of those commonly used in anodes of conventional electrochemical devices. Non-limiting examples of preferred anode active materials include lithium, lithium alloys and lithium intercalation materials such as carbon, petroleum coke, activated carbon, graphite, and other carbonaceous materials. Non-limiting examples of suitable cathode current collectors include aluminum foils, nickel foils, and combinations thereof. Non-limiting examples of suitable anode current collectors include copper foils, gold foils, nickel foils, copper alloy foils, and combinations thereof.

The electrochemical device of the present invention may use a salt as an electrolyte. For example, the salt can be represented by $A^+B^-$ wherein $A^+$ is an alkali metal cation such as $Li^+$, $Na^+$, $K^+$ or a combination thereof and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$. $N(CF_3SO_2)_2^-$, $C(CF_2SO_2)_3^-$ or a combination thereof. The salt may be dissolved or dissociated in an organic solvent. Examples of suitable organic solvents include, but are not limited to, propylene carbonate (PC), ethylene carbonate (EC), diethyl carbonate (DEC), dimethyl carbonate (DMC), dipropyl carbonate (DPC), dimethylsulfoxide, acetonitrile, dimethoxyethane, diethoxyethane, tetrahydrofuran, N-methyl-2-pyrrolidone (NMP), ethyl methyl carbonate (EMC) and γ-butyrolactone. These organic solvents may be used alone or as a mixture thereof.

The electrolyte may be injected in any suitable step during manufacture of the electrochemical device depending on the fabrication processes and desired physical properties of a final product. In other words, the electrolyte may be injected before assembly of the battery or in the final step of battery assembly.

Hereinafter, the present invention will be explained in detail with reference to embodiments. The embodiments of the present invention, however, may take several other forms, and the scope of the invention should not be construed as being limited to the following examples. The embodiments of the present invention are intended to more comprehensively explain the present invention to those skilled in the art.

EXAMPLES

Example 1

Manufacture of Separators Including Porous Substrate Treated by Corona Discharge A mixture of polyvinylidene fluoride-co-hexafluoropropylene (PVdF-HEP) and cyanoethylpullulan (10:1.75 (w/w)) was dissolved in acetone at 50° C. for about 12 hr to prepare a polymer solution. Barium titanate ($BaTiO_3$) powder as an inorganic material was added to the polymer solution such that the weight ratio of the polymer mixture to the inorganic material was 9:1. The inorganic particles were crushed and dispersed in the mixture by ball milling to prepare a slurry. The inorganic particles of the slurry were an average particle diameter of 600 nm.

One surface of 12 μm thick polyethylene porous membranes (porosity: 45%, Gurley value: 230 sec/100 mL) was treated by corona discharge at a watt density of 80 Wmin/m². The porosity and Gurley value of the polyethylene porous membranes after corona discharge were maintained constant (45% and 232.5 sec/100 mL, respectively), which were substantially the same as those before corona discharge.

The polyethylene porous membrane treated by corona discharge and the polyethylene porous membrane untreated by corona discharge were passed through nip rolls to produce a laminate.

The laminate of the polyethylene porous membranes was dip-coated with the slurry and passed through an oven at 60° C. to remove the solvents from the slurry. The coated polyethylene porous membranes were separated from each other, completing the manufacture of two separators. Only one surface of each of the separators was covered with an organic/inorganic composite layer. The Gurley values of the two separators were 415.2 sec/100 mL and 408.7 sec/100 mL, which are levels suitable for use in secondary batteries.

Comparative Example 1

Manufacture of Separators Including Porous Substrate Untreated by Corona Discharge (Laminated Under Pressurization and Heating)

Two 12 μm thick polyethylene porous membranes (porosity: 45%) untreated by corona discharge were passed through pressurization rolls under 1.5 kg/cm at 110° C. to produce a laminate. Immediately after lamination, the polyethylene porous membranes were separated from each other. Each of the polyethylene porous membranes was found to have a surface porosity as low as about 23% and a Gurley value as high as 315.6 sec/100 mL, demonstrating damage to the surface pores.

The laminate of the polyethylene porous membranes was dip-coated with the slurry prepared in Example 1 and passed through an oven at 60° C. to remove the solvents from the slurry. The coated polyethylene porous membranes were separated from each other, completing the manufacture of two separators. Only one surface of each of the separators was covered with an organic/inorganic composite layer. The Gurley values of the two separators were markedly increased to 1094.6 sec/100 mL and 1119.8 sec/100 mL, which are levels unsuitable for use in secondary batteries.

Comparative Example 2

Manufacture of Separator by Slot Coating

A 12 μm thick polyethylene porous membrane (porosity 45%) untreated by corona discharge was slot-coated with the slurry prepared in Example 1 and were then passed through an oven at 60° C. to remove the solvents from the slurry, completing the manufacture of a separator. The Gurley value of the separator was 432.6 sec/100 mL, which is a level suitable for use in a secondary battery.

Test Example 1

Observation of Surface Damage by SEM Imaging

Figure 2:
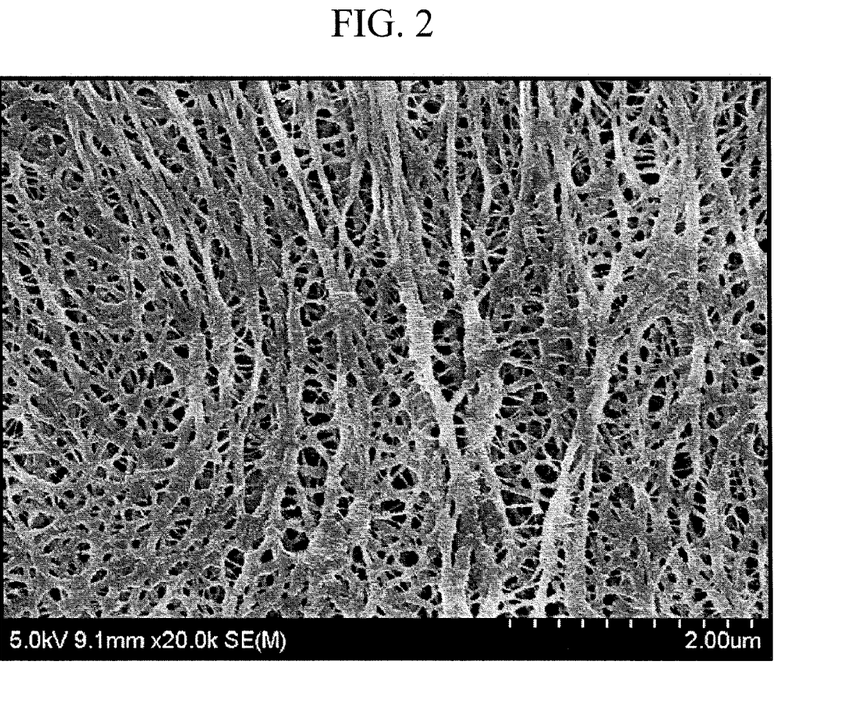
FIG. 2 is a scanning electron microscope (SEM) image showing the surface of a porous membrane after corona discharge in Example 1.
Figure 3:
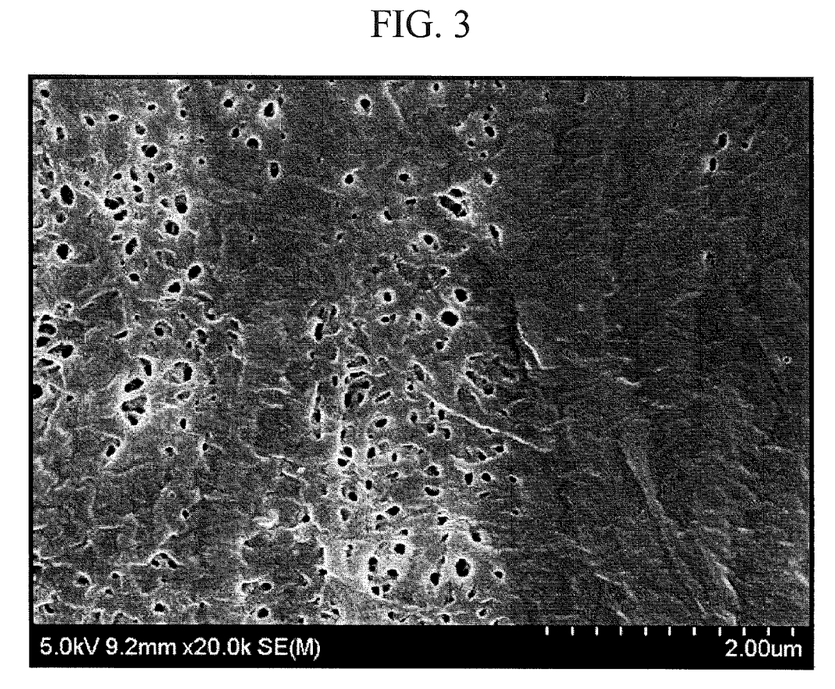
FIG. 3 is a SEM image showing the surface of a porous membrane after pressurization and heating in Comparative Example 1.

Images of the surface of the polyethylene porous membrane treated by corona discharge in Example 1 and the surface of the polyethylene porous membrane separated after heating and pressurization in Comparative Example 1 were taken by SEM, and the images are shown in FIGS. 2 and 3, respectively.

The image of FIG. 2 shows that there was little or no damage to the surface pores of the porous membrane. In contrast, the image of FIG. 3 shows that there was great damage to the surface of the porous membrane after heating and pressurization.

Test Example 2

Distributions of Binder Polymer by ATR-FTIR Spectroscopic Measurement

The distributions of the binder polymer present in the separators manufactured in Example 1 and Comparative Example 2 were measured at different thicknesses of the porous substrates. The results are graphically shown in FIG. 5.

Figure 5:
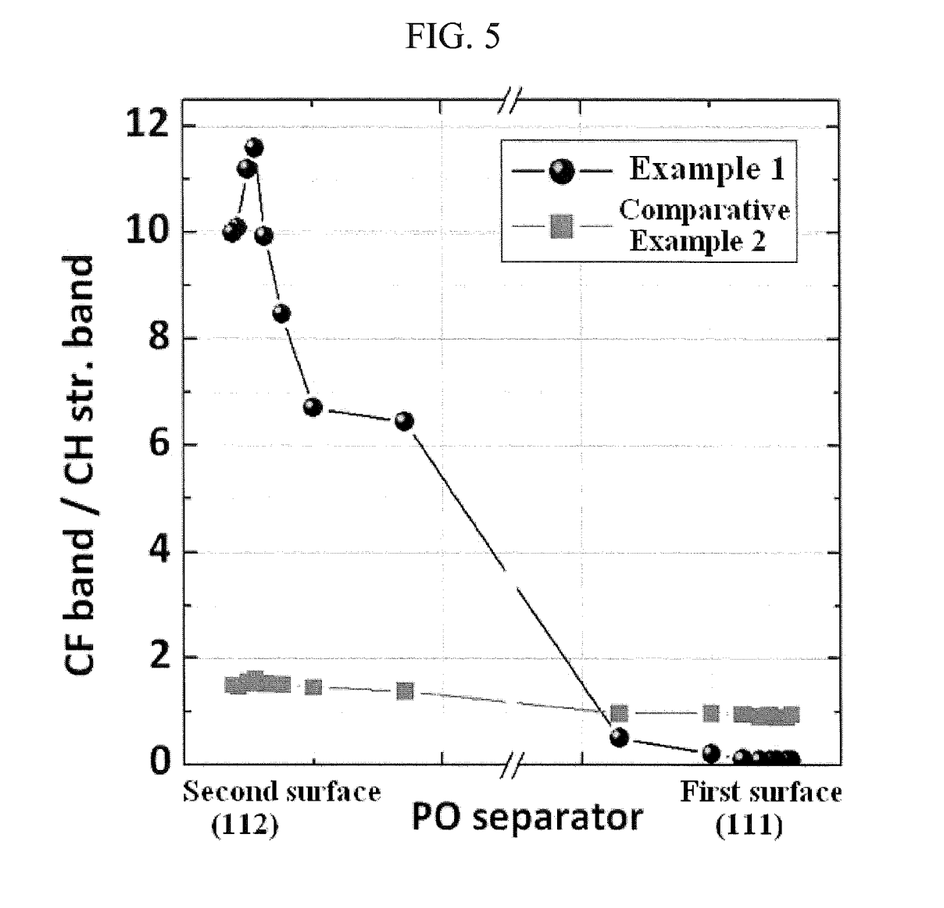
FIG. 5 is a graph showing the distributions of a binder polymer in separators manufactured in Example 1 and Comparative Example 2.

It can be known from the graph of FIG. 5 that the binder polymer was distributed at the coated surface as well as at the surface opposed to the coated surface of the separator manufactured in Comparative Example 2. In contrast, the binder polymer was detected only in portions of the coated surface of the separator manufactured in Example 1.

Table 1 shows the areas of the characteristic peaks of the binder polymer and the porous substrate of the separator manufactured in Example 1 and the areas of the characteristic peaks of the binder polymer and the porous substrate of the separator manufactured in Comparative Example 2. The area values were substituted into the mathematical FIG. 1. The results are shown in Table 1.

TABLE 1

| | Ratio of areas of characteristic peaks | |
|---|---|---|
| | Example 1 | Comparative Example 2 |
| CF band of binder polymer at coated surface/CH stretching band of porous substrate at coated surface | 10.1 | 1.49 |
| CF band of binder polymer at uncoated surface/CH stretching band of porous substrate at uncoated surface | 0.08 | 0.88 |
| Value calculated by Mathematical FIG. 1 | 0.01 | 0.59 |

As can be seen from the results in Table 1, the value calculated by the mathematical FIG. 1 for the separator manufactured in Example 1 approximates zero.

What is claimed is:

1. A method for manufacturing separators comprising:
   (S1) treating at least one of the laminating surfaces of two porous substrates by corona discharge and laminating the porous substrates,
   (S2) preparing a slurry containing inorganic particles dispersed therein and a solution of a binder polymer in a solvent, and coating the slurry on both surfaces of the laminate of the porous substrates, and
   (S3) delaminating the coated laminate of the porous substrates.

2. The method according to claim 1, wherein each of the porous substrates is made of a polyolefin.

3. The method according to claim 2, wherein the polyolefin is selected from the group consisting of polyethylene, polypropylene, polybutylene and polypentene.

4. The method according to claim 1, wherein each of the porous substrates has a thickness of 5 to 50 μm, a pore size of 0.01 to 50 μm and a porosity of 10 to 95%.

5. The method according to claim 1, wherein the slurry is coated on the porous substrates by dip coating.

6. The method according to claim 1, wherein the inorganic particles have an average particle diameter of 0.001 to 10 μm.

7. The method according to claim 1, wherein the inorganic particles are selected from the group consisting of inorganic particles having a dielectric constant of 5 or above, inorganic particles having the ability to transport lithium ions, and mixtures thereof.

8. The method according to claim 7, wherein the inorganic particles having a dielectric constant of 5 or above are selected from the group consisting of $BaTiO_3$, $Pb(Zr_x,Ti_{1-x})O_3$ (PZT, $0<x<1$), $Pb_{1-y}La_xZr_{1-y}Ti_yO_3$ (PLZT, $0<x<1$, $0<y<1$), $(1-x)Pb(Mg_{1/3}Nb_{2/3})O_3-xPbTiO_3$ (PMN-PT, $0<x<1$), hafnia ($HfO_2$), $SrTiO_3$, $SnO_2$, $CeO_2$, $MgO$, $NiO$, $CaO$, $ZnO$, $ZrO_2$, $SiO_2$, $Y_2O_3$, $Al_2O_3$, $SiC$, $TiO_2$ particles, and mixtures thereof.

9. The method according to claim 7, wherein the inorganic particles having the ability to transport lithium ions are selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), (LiAlTiP)$_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y<2$, $0<z<4$), $P_2S_5$ type glass ($Li_xP_yS_z$, $0<x<3$, $0<y<3$, $0<z<7$) particles, and mixtures thereof.

10. The method according to claim 1, wherein the inorganic particles and the binder polymer are used in a weight ratio of 50:50 to 99:1.

11. The method according to claim 1, wherein the binder polymer is selected from the group consisting of polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose, and mixtures thereof.

12. A separator comprising a porous substrate wherein the porous substrate has an uncoated first surface and a second surface covered with an organic/inorganic composite layer containing inorganic particles and a binder polymer, and the areas of characteristic peaks of the binder polymer and the porous substrate at the first and second surfaces, as measured using an attenuated total reflection Fourier transform infrared (ATR-FTIR) spectrometer, satisfy the mathematical FIG. 1:

Mathematical Figure 1

$$0 \leq \left[ \frac{\left( \begin{array}{c} \text{Area of characteristic} \\ \text{peaks of the first binder} \\ \text{polymer at the first surface} \end{array} \right)}{\left( \begin{array}{c} \text{Area of characteristic} \\ \text{peaks of the porous} \\ \text{substrate at the first surface} \end{array} \right)} \middle/ \frac{\left( \begin{array}{c} \text{Area of characteristic peaks} \\ \text{of the first binder polymer} \\ \text{at the second surface} \end{array} \right)}{\left( \begin{array}{c} \text{Area of characteristic peaks} \\ \text{of the porous substrate} \\ \text{at the second surface} \end{array} \right)} \right] < 0.5.$$

13. An electrochemical device comprising a cathode, an anode and the separator according to claim 12 interposed between the cathode and the anode.

14. The electrochemical device according to claim 13, wherein the electrochemical device is a lithium secondary battery.

* * * * *

UNITED STATES PATENT AND TRADEMARK OFFICE
CERTIFICATE OF CORRECTION

PATENT NO. : 8,257,857 B2  
APPLICATION NO. : 13/088548  
DATED : September 4, 2012  
INVENTOR(S) : Joo-Sung Lee and Jong-Hun Kim It is certified that error appears in the above-identified patent and that said Letters Patent is hereby corrected as shown below:

In the Specification

Column 1, line 36, "has" should read -- have --.
Column 2, line 18, "surface" should read -- surfaces --.
Column 3, line 65, "a SEM" should read -- an SEM --.
Column 6, line 2, "organic inparticles" should read -- Inorganic particles --.
Column 11, line 17, "were" should read -- was --.

In the Claims

Column 12, line 49, "$Pb_1$" should read -- $Pb_{1-x}$ --.

Signed and Sealed this
Sixth Day of January, 2015

Michelle K. Lee
*Deputy Director of the United States Patent and Trademark Office*